United States Patent [19]
Bucholtz et al.

[11] 3,921,284
[45] Nov. 25, 1975

[54] ARMATURE WINDING METHOD AND MACHINE

[75] Inventors: Glen E. Bucholtz, Tipp City; Hyman B. Finegold, Dayton, both of Ohio

[73] Assignee: The Globe Tool and Engineering Company, Dayton, Ohio

[22] Filed: Mar. 13, 1973

[21] Appl. No.: 340,653

[52] U.S. Cl. ........... 29/597; 29/205 C; 29/205 CM; 29/598; 242/7.03; 242/7.05 B
[51] Int. Cl.² ............... H02K 15/09; H01R 43/06
[58] Field of Search .. 29/597, 598, 205 C, 205 CM, 29/205 R; 310/234; 242/7.03, 7.05 R, 7.05 B, 7.05 C

[56] References Cited
UNITED STATES PATENTS

| | | | |
|---|---|---|---|
| 3,628,229 | 12/1971 | Biddison et al. | 29/205 C |
| 3,713,208 | 1/1973 | Doyle | 29/597 |
| 3,713,209 | 1/1973 | Biddison | 29/597 |
| 3,785,034 | 1/1974 | Bucholtz | 29/205 C |
| 3,857,172 | 12/1974 | George et al. | 29/597 |

*Primary Examiner*—Carl E. Hall
*Attorney, Agent, or Firm*—Dybvig & Dybvig

[57] ABSTRACT

The inner commutator shield of a double flier armature winding machine is provided with notches having edges for severing wire leads hooked around commutator tangs closely adjacent the tangs.

Two embodiments are illustrated, one wherein the armature is rotated to sever the wires and the other wherein the inner shield is rotated. In both cases finish wires are cut by first rotating the armature to position selected tangs closely adjacent the notches after the wires are first hooked to the selected tangs. The wire segments between the tangs and the fliers are gripped by clamps prior to the severing of the finish wires. The mechanism described may also be used for the severing of start wires.

6 Claims, 9 Drawing Figures

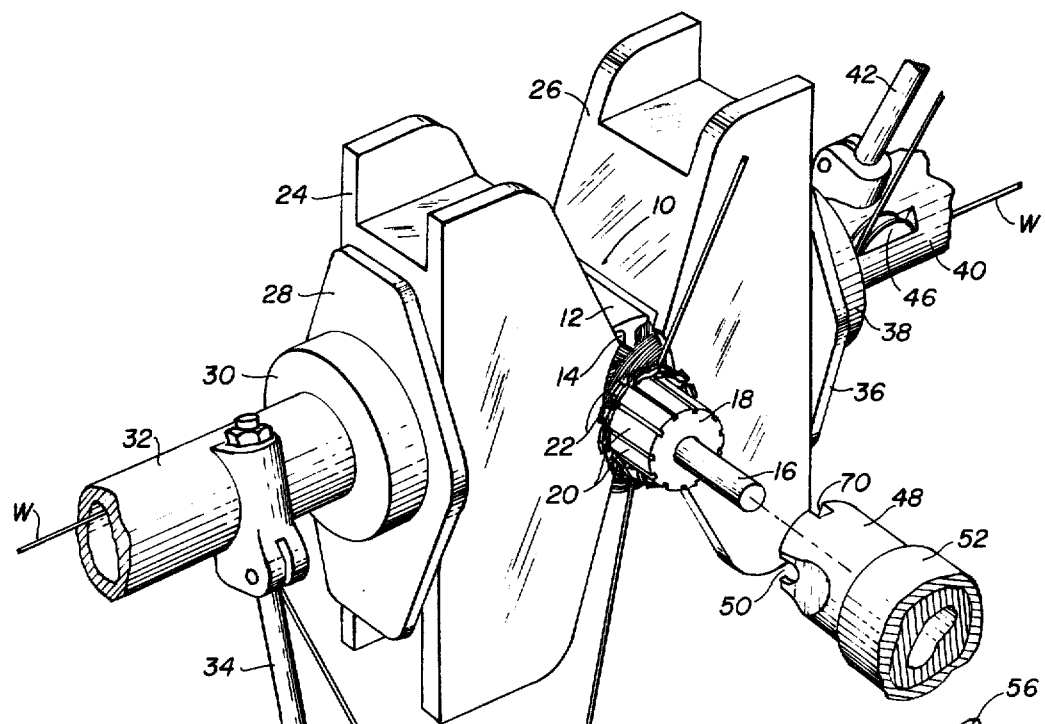
FIG.1
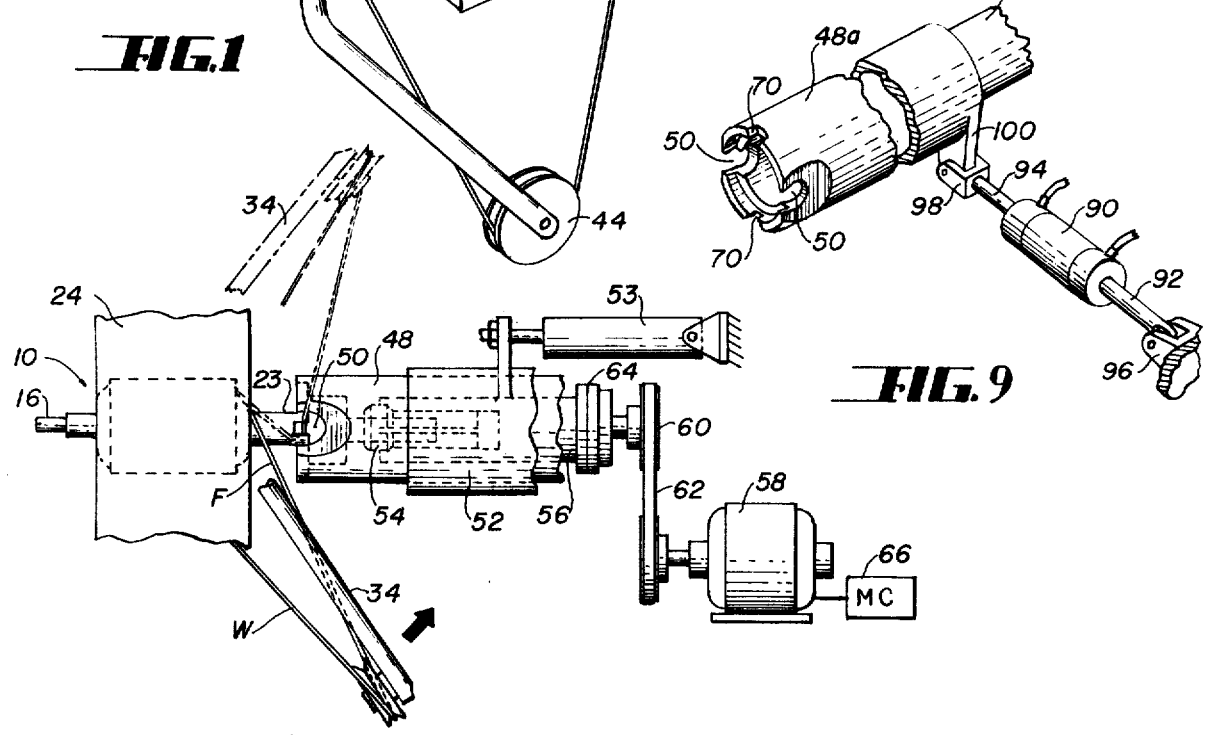
FIG.2
FIG.9

ARMATURE WINDING METHOD AND MACHINE

BACKGROUND OF THE INVENTION

This invention relates to an armature winding method and machine and more particularly to the severing of finish wires free from the fliers of a double flier armature winding machine. As will become apparent, the invention is not necessarily so limited and, for example, can be used in single flier armature winding machines. Also, as will be discussed, the invention may be utilized in the severing of start wires.

The present invention is intended for use in the winding of armatures of the type having an armature core and a commutator mounted in spaced relation on an armature shaft and wherein the commutator is provided with coil lead receiving hooks or tangs. The term "finish wire" as used herein refers to the wire segment extending from the last coil wound in an armature core by a flier. In double flier armature winding machines having two fliers, there are also two finish wires. The term "start wires" refers to the wire segments leading to the first coils wound by the fliers.

U.S. Pat. No. 3,713,209 granted to John M. Biddison on Jan. 30, 1973, discloses a machine and method utilizing wire clamps which engage the finish wires of a double flier armature winding machine and cutters operable to cut the finish wires close to the commutator tangs between the clamps and the tangs while the wound armature is still located between the winding forms in the winding machine. The wires are held clamped during the interval in which the wound armature is cut free, removed from the winding machine, and an unwound armature inserted in its place. The aforementioned patent U.S. Pat. No. 3,713,209 also describes the commencement of the winding of the next armature and a method for severing the clamped wires after the start wires for the unwound armature are connected to the commutator tangs.

Other methods and apparatus have been developed for the purpose of severing start and finish wires. The known methods and apparatus require that cutters and cutter drives be added to the armature winding machine and/or require the use of clamps with fairly complex clamp positioning and operating devices.

SUMMARY OF THE INVENTION

This invention provides an improved approach to the cutting of the coil lead wires from an armature while it is still located in the winding machine. Pursuant to this invention, the commutator shielding device, which is now conventionally utilized in many armature winding machines, includes an inner shield or sleeve with a pair of diametrically opposed notches having wire cutting or shearing edges. The finish wires are automatically extended through the notches after they are connected to the commutator tangs. By relatively rotating the inner shield and the armature, the wire segments extended from the last mentioned tangs to the fliers are effectively backed up by the tangs and severed by the edges of the notches.

When this invention is incorporated in armature winding machines provided with armature rotators, such as those described in U.S. Pat. No. 3,506,864 issued to Jerry E. Miller on Apr. 14, 1970, and U.S. Pat. No. 3,524,601 issued to John M. Biddison et al. on Aug. 18, 1970, the armature rotator can be used to rotate the armature into a position whereat the finish wires readily enter the notches and also to rotate the armature after the wires are in the notches to cut the armature free. In a related embodiment, a rotator is provided for rotating the inner shield to cut the wires.

Although the method and apparatus described herein are primarily intended for use in cutting the finish wires, they can readily be adapted for the cutting of start wires. Alternatively, this invention may be utilized with other methods or apparatus for cutting start wires.

BRIEF DESCRIPTION OF THE DRAWING

FIG. 1 is a partially exploded perspective view of a double flier armature winding machine of the type which can be used in the practice of this invention. FIG. 1 also shows an armature located between the winding forms thereof.

FIG. 2 is a side elevational view of parts of the winding machine and the armature of FIG. 1 illustrating the hooking of a finish wire about a selected commutator tang. FIG. 2 also contains a simplified, schematic illustration of an armature rotator mechanism forming part of the winding machine. Beginning with FIG. 2, the several figures of the drawing disclose only a single wire leading from the armature to a single flier. Further, because this invention is directed primarily to the cutting of the finish wires, the armature and commutator would most accurately be shown with a full complement of coils and connections of the wires between coils to the commutator tangs. However, all of the coils and commutator tang connections have not been shown in FIG. 2 and in the following figures in order to avoid a confusion of lines.

In FIGS. 3 to 6, the number of commutator hooks or tangs illustrated has been reduced, again in order to avoid a confusion of lines.

FIGS. 4 and 5 are views similar to FIG. 3 and illustrating additional steps preparatory to the cutting of the finish wire.

FIG. 6 is an enlarged perspective view of portions of the armature and the winding machine and illustrating the same position of parts shown in the side elevational view of FIG. 5.

FIG. 9, which is on the first sheet of drawing, is a perspective view illustrating a second embodiment of this invention wherein means is provided for rotating the inner shield.

DESCRIPTION OF THE PREFERRED EMBODIMENTS

Figure 3:
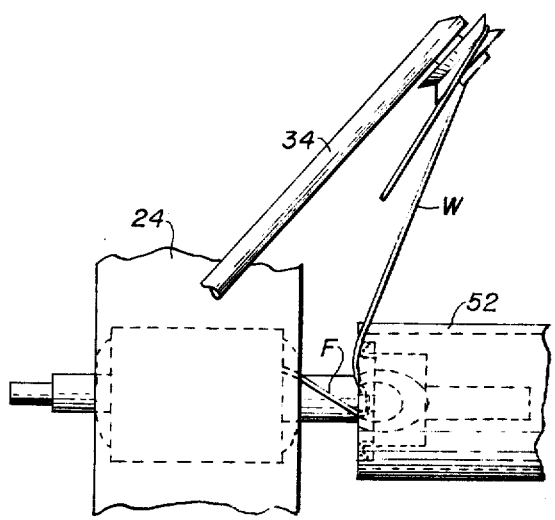
FIG. 3 is a side elevational view showing the armature and part of the machine of FIGS. 1 and 2 illustrating a further step in the hooking of the finish wire to its associated tang.

Referring to FIGS. 1 and 2, this invention is concerned with the termination of the winding of an armature of the type generally designated 10 including an armature core 12 having radially inwardly directed coil receiving slots 14 mounted on an armature shaft 16. A commutator 18 is mounted upon the same shaft and has a plurality of segments 20 terminating in tangs or hooks 22. The section of the shaft 16 between the core 12 and the commutator 18 is covered by an insulating sleeve 23.

A portion of a double flier winding machine used for winding the armature 10 is shown in FIG. 1 and includes left and right side (as viewed in FIG. 1) wire guide wings or winding forms, designated 24 and 26, respectively, the armature 10 being supported at least partly by the confronting concavely curved surfaces thereof. The left side winding form 24 is mounted upon a mounting plate 28 which in turn is supported on a bearing housing 30 that rotatably receives a flier spindle 32 on which is affixed a flier 34. The right side winding form 26 is similarly mounted on a mounting plate 36 affixed to a bearing housing 38 rotatably receiving a spindle 40 for a flier 42.

As conventional, wire, designated W, is dereeled from a supply spool (not shown) and coursed through the spindle 32 around a pulley (not shown) mounted for rotation thereon and another pulley 44 mounted for rotation at the terminal end of the flier 34. Another strand of wire W passes through the spindle 40, around a pulley 46 rotatably mounted on the spindle 40 and around a pulley (not shown) at the free end of the flier 42. As well known to those skilled in the art, the fliers 34 and 42 may be rotated to wind coils, two at a time, into pairs of spaced slots 14 of the core 12. Appropriate machine elements and control devices (not shown) are provided for spreading the winding forms 24 and 26 when an armature is inserted or removed, for rotating the fliers 34 and 42 in proper timed sequence, and for indexing the armature 10 as required to present new pairs of slots in position to receive coils wound by the fliers.

During the intervals in which the fliers 34 and 42 are rotating to wind coils, it is necessary to shield the commutator hooks 22 so that the wires are not accidentally hooked thereover. For this purpose a fixed, hollow, cylindrically tubular inner commutator shield 48 is partially illustrated which, in use, surrounds the commutator 18. The shield 48 has a first pair of diametrically opposed notches 50, only one of which is illustrated in FIG. 1, the other being hidden from view. The notches 50 are located in a generally horizontal plane, thereby exposing the two diametrically opposed hooks 22 located in the generally horizontal plane. During the winding of coils, the hooks 22 exposed by the notches 50 are covered by a movable tubular outer commutator shield 52 mounted for sliding movement in surrounding relation to the inner shield 48. When lead wire connections are to be made to a pair of hooks 22, the outer shield 52 is retracted by an air actuator 53 to also expose the generally horizontally located hooks 22.

During the winding of coils, the two fliers 34 and 42 rotate in opposite directions as viewed from the front or back of the machine. Thus, with reference to the orientation of parts as viewed in FIG. 1, the left side flier 34 would rotate in a "top coming" direction while at the same time the right side flier 42 rotates in a "top going" direction. The operations of the two fliers 34 and 42 are otherwise identical except in the well known case of the winding of armatures having an odd number of slots. Therefore, the continued description of the instant invention is made only with reference to the left side flier 34, it being understood that the right side flier 42 would operate in an identical fashion.

In FIGS. 1 and 2, the fliers 34 and 42 are shown in the positions they occupy at the end of the winding of the last coil. The finish wires which lead from these coils are then hooked about the appropriate commutator tangs 22. Such a finish wire is designated F in FIG. 2. To accomplish the hooking of the finish wire F, the outer shield 52 is retracted and the flier 34 moved in a counterclockwise direction through a partial revolution into that position shown by broken lines in FIG. 2. This direction of flier rotation is opposite that through which the flier 34 rotates when winding coils. Thereafter, as shown in FIG. 3, the outer shield 52 is extended back into covering relation to the commutator 18 and the notched end of the inner shield 48. The finish wire segment immediately beyond the tang 22 is thereby bent toward the armature core 12 to further hook the finish wire around the tang. This manner of hooking the finish wires is the same as commonly used for making other lead wire connections.

Figure 4:
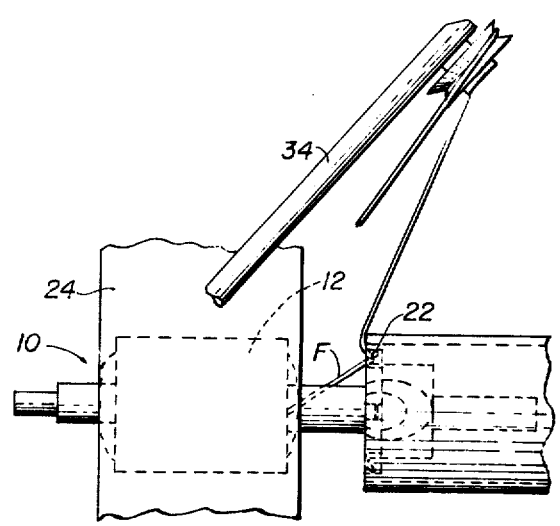

As illustrated in FIGS. 2 and 3, the finish wires are hooked about tangs located approximately at the "3 o'-clock" and the "9 o'clock" positions. That is, the tangs are located at approximately the horizontal midline of the armature. In accordance with this invention, the armature is rotated after the finish wires are hooked, in order to bring these tangs 22 essentially to vertical, i.e., the "12 o'clock" and the "6 o'clock" positions. The rotated position of the armature 10 is illustrated in FIG. 4. Since only one of the finish wires is illustrated in FIGS. 2-7, only that wire hooked around the tang 22 which has been rotated from approximately the 3 o'-clock to approximately the 12 o'clock position is shown. Here it may be observed that the wires guided by the fliers of double flier armature winding machines are supplied to the flier pulleys under tension typically provided by wire dereeling devices including spring loaded dancer arms (not shown) which, within reasonable range, maintain the wire taut at all times. A comparison of FIGS. 3 and 4 reveals that the length of wire between the finish wire receiving tang 22 and the left flier 34 is shortened because of the armature rotation. However, the reduction in length is slight and the wire remains adequately taut because of the operation of the dereeling mechanism.

Armature rotating mechanism suitable for the purpose of this invention could include the mechanism otherwise utilized to rotate the armature between the winding of coils. Such mechanism preferably includes a collet located within the inner shield 48 which grips the armature shaft 16. Mechanism suitable for this purpose is shown, for example, in the said Biddison et al. U.S. Pat. No. 3,524,601. Such mechanism is schematically illustrated in FIG. 2 as including a collet 54 rotated by a collet shaft 56 in turn driven by a drive system including a motor 58 and a pulley 60 driven by a belt 62. As more fully described in the aforementioned Biddison et al. U.S. Pat. No. 3,524,601 the pulley 60 may be connected to the shaft 56 through a clutch mechanism 64. The operation of the motor 58 is controlled synchronously with the other machine operations through conventional motor control circuitry represented schematically by the box 66.

Further in accordance with this invention, the end of the inner shield 48 closest to the armature core 12 has a second pair of diametrically opposed, wire receiving notches 70 spaced from the notches 50 and located out of the paths followed by the wires when the wire leads are connected to the tangs 22. The notches 70 are preferably located along a generally vertical diameter portion of the inner shield 48. Both notches 70 are bounded by the body of the inner shield 48. Preferably the left side portion of the uppermost notch 70 is beveled to terminate in substantially a knife edge 72 at the inner margin of the inner shield 48 which confronts the left most edge of the tang 22 (as viewed in FIGS. 6 to 8) when the tang 22 is essentially in the 12 o'clock position. The right side portion of the lower notch 70 is similarly beveled to terminate in a knife edge 73 at the inner margin of the inner shield 48 (FIG. 6).

After the parts have reached the position illustrated in FIG. 4, the wire segment between the tang 22 receiving the finish wire F is gripped by a wire clamp 74 and the outer shield 52 is retracted, whereupon the extension of the finish wire F above the tang 22 enters the upper notch 70. The parts are now in the position illustrated in FIGS. 5, 6 and 7. Here it will be understood that there is another wire clamp which is not shown but which would be concerned with the operation of flier 42 and located beneath the commutator 18. The specific construction and operation of each wire clamp 74 is unimportant for purposes of this invention. Briefly any clamp device capable of securely holding the wire in the location illustrated in FIG. 5 would be adequate. Preferably such device is mounted for movement toward and away from the winding area of the winding machine so that, except when used in the cutting of the finish and the start wires, it can be positioned remotely from the winding area. As described in the aforementioned Biddison U.S. Pat. No. 3,713,209, the clamps remain engaged with the wires until the armature is cut free, as described below, the wound armature 10 removed, and the winding of another armature is commenced.

Figure 5:
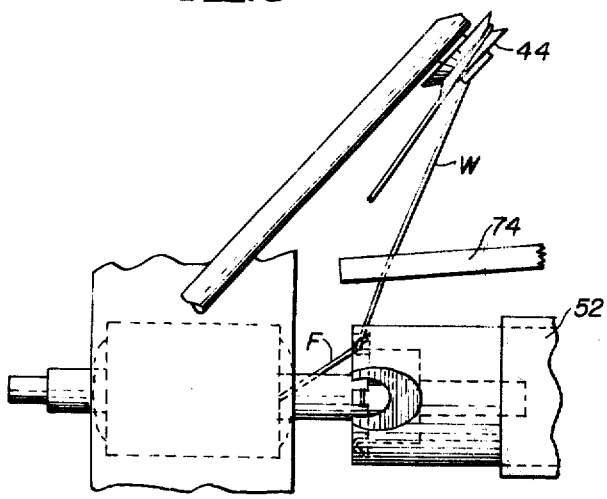
Figure 6:
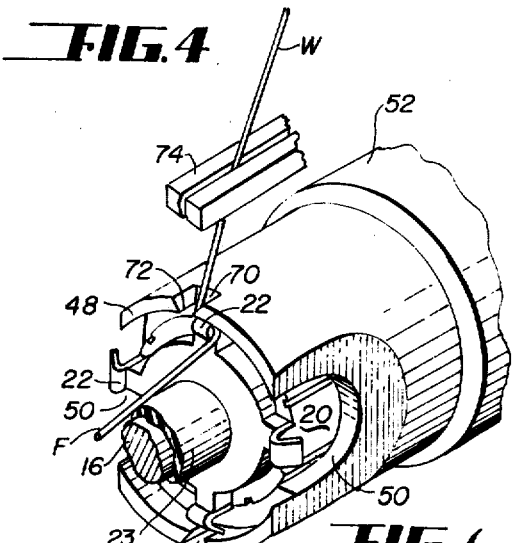
Figure 7:
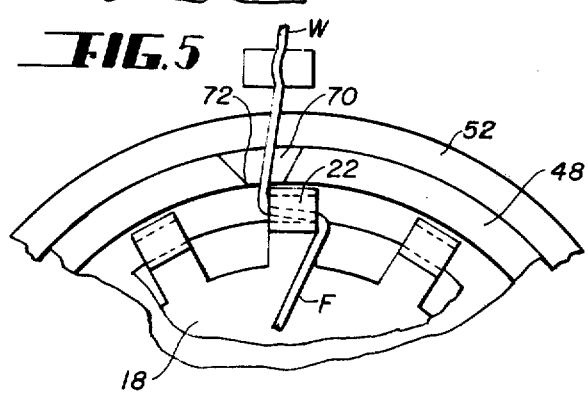
FIG. 7 is an elevational view of a portion of the commutator and parts of the winding machine illustrating the relationship of the finish wire tang to the finish wire and the inner shield in the position also illustrated in FIGS. 5 and 6.
Figure 8:
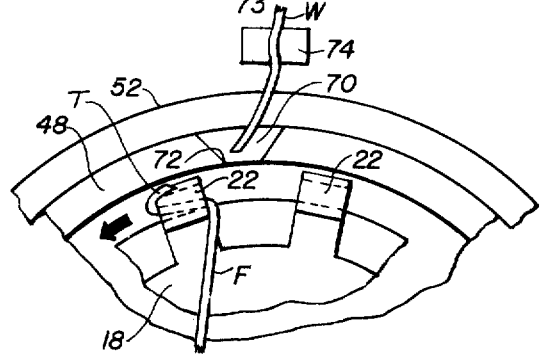
FIG. 8 is a view similar to FIG. 7 illustrating the parts after the finish wire has been cut.

After the parts reach the position illustrated in FIGS. 5, 6 and 7, the actual cutting of the wire segment between the commutator 22 and the clamp 74 can take place. Pursuant to this invention the wire is cut immediately adjacent the tang 22 by relative rotation of the armature 10 and the inner shield 48. With reference to FIG. 8, the presently preferred procedure is to rotate the armature because the same mechanism shown in FIG. 2 used to rotate the armature to bring the tangs 22 receiving the finish wires to vertical can be utilized for cutting the wires and no additional apparatus need be added to the machine. It will be noted that the armature 10 has been rotated in the direction of the arrow in FIG. 8, that is, further in the counterclockwise direction, causing the wire to be cut between the knife edge 72 and the tang 22. The tang 22 serves as a "back up" for severing the wire and the cutting or shearing results in the severing of the wire quite close to the tang 22.

During both increments of counterclockwise rotation of the armature, first to the position shown in FIG. 4 and then to the position shown in FIG. 8, the finish wire F is bent further around the tang 22. Therefore, after the cutting of the finish wire, there is a small severed end or tail portion T bent over the top edge of the tang 22. It has been found that the resultant grip of the finish wire upon the tang 22 is sufficient to retain the connection of the finish wire to the tang 22 until a more permanent connection has been formed such as is usually accomplished when hot staking the tangs 22.

The gripping of the wire by the clamp 74 and the retraction of the shield 52, as illustrated in FIG. 5, takes place essentially simultaneously. In practice it has been found that the wire can be gripped before the shield 52 is retracted because the wire segment between the clamp 74 and the tang 22, which wire has been previously bent toward the armature core, as shown in FIGS. 3 and 4, tends to spring into the notch 70. Therefore, the mere retraction of the shield 52 is ordinarily sufficient to position the wire in the notch 70. However, it may sometimes be necessary to forcibly draw the wire into the notch 70 by moving the clamp 74 away from the armature core 12.

FIG. 9 illustrates a modification which may be useful in some cases. In FIG. 9 the inner shield, which is designated 48a, is identical to the inner shield 48 described above. Thus it has opposed notches 50 and opposed notches 70 for the same purpose as the identically numbered notches described above and it is adapted to receive a collet (not shown) driven by a shaft 56. In FIG. 9, the machine has been provided with a double acting air actuator 90 having opposed piston rods 92 and 94 pivotally mounted at 96 and 98, respectively, to a fixed part of the machine and to a flange 100 connected to the inner shield 48a. As apparent, the air actuator 90 and associated parts can be used to rotate the inner shield 48a when severing the finish wires. In operation, the procedure would be the same described above through FIG. 7. After the parts have reached the position shown in FIG. 7, the air actuator 90 would be energized to rotate the inner shield 48a to sever the wires.

Those skilled in the art will readily recognize that the apparatus described above could be used for severing start wires as well as finish wires. When used for severing start wires, the portion of the wires between the wire clamps 74 and the parts hooked about a pair of tangs would again have to be located in the notches 70. In such case, to avoid the problem of these wire segments going slack, the clamps 74 may have to be moved away from the core 12.

Also, depending upon the geometry of the tangs, the side margins of the notches 70 could both be beveled to form knife edges for cutting in opposite directions as the case may require. Furthermore, notches similar to the notches 70 could be formed without sharp knife edges if the tangs about which the start and finish wires are hooked or looped are sufficiently close to the inside of the inner shield that the wire is sheared solely by the movement of the notch margins relative to the tang margins.

Although the presently preferred embodiments of this invention have been described, it will be understood that within the purview of this invention various changes may be made within the scope of the appended claims.

We claim:

1. For use with a flier-type armature winder of the type having a commutator shield device including a notched inner shield and means for covering the inner shield and commutator tangs during the winding of coils of wire by a flier, a method for connecting a finish wire of an armature being wound to a selected commutator tang and for severing the finish wire comprising the steps of:
   1. locating a notch in said inner shield in overlying relation to said commutator and angularly spaced from said selected tang,
   2. at the termination of the winding of the last coil by said flier, exposing said selected tang,
   3. rotating said flier in a direction opposite to its direction of rotation when winding coils, thereby to hook the wire leading from said flier over said selected tang,
   4. bending the portion of said wire between said selected tang and said flier toward the armature core, 5. rotating said armature core and said commutator to position said selected tang adjacent said notch,
6. positioning said bent portion of wire in said notch,
7. relatively rotating the armature and said inner shield to cause said wire to be severed by an edge of said notch, and
8. prior to the severing of said wire clamping said wire between said selected tang and said flier.

2. The method of claim 1 wherein said armature is first rotated (step 5) in a direction to cause said wire to be extended further about said tang.

3. The method of claim 2 wherein said inner shield remains stationary and said armature is rotated the second time (step 7) in the same direction as it was first rotated (step 5) whereby the cut end of the wire engaging said tang is bent by said edge of said notch around said tang.

4. A commutator shield construction for use in a flier type armature winding machine comprising a tubular member adapted to receive a commutator of an armature being wound and having an end portion overlying the commutator tangs, said end portion having a first pair of substantially diametrically opposed notches exposing a pair of commutator tangs for permitting the hooking or looping of wire about said pair of commutator tangs, said end portion having a second pair of substantially diametrically opposed notches angularly spaced from said first pair of notches, each notch of said second pair being bounded by body portions of said tubular member and the body portion defining one side of each of said second pair of notches terminating in a cutting edge at the inner margin of said member for severing wires located in said second pair of notches between said inner margin and the tangs from which said wires extend upon rotation of said tubular member relative to the commutator received thereby, and said shield construction further including means for selectively preventing wire from entering said notches.

5. The construction of claim 4 wherein said last mentioned means comprises a tubular outer shield surrounding said tubular member and means for moving said outer shield toward and away from the armature core with which said commutator is associated.

6. For use with a flier-type armature winder of the type having a shield device including means for covering commutator tangs during the winding of coils of wire by a flier, a method for severing a wire lead comprising the steps of:
1. locating a notch in a portion of said shield device in overlying relation to said commutator,
2. after connecting said lead to a commutator tang, positioning said lead in said notch, and
3. severing said lead between said tang and said notch by relatively rotating the armature and said portion of said shield device.

* * * * *